United States Patent Office.

BENNO HOMOLKA, OF FRANKFORT-ON-THE-MAIN, AND FRIEDRICH HÜBNER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY.

PROCESS OF MAKING PHENYLGLYCIN-ORTHO-CARBOXYLIC ACID.

SPECIFICATION forming part of Letters Patent No. 675,217, dated May 28, 1901.

Application filed March 12, 1901. Serial No. 50,783. (No specimens.)

*To all whom it may concern:*

Be it known that we, BENNO HOMOLKA, Ph. D., residing at Frankfort-on-the-Main, and FRIEDRICH HÜBNER, Ph. D., residing at Höchst-on-the-Main, in the Empire of Germany, citizens of the Empire of Germany, have invented certain new and useful Improvements in the Manufacture of Phenylglycin-Ortho-Carboxylic Acid, of which the following is a specification.

Our process to manufacture phenylglycin-ortho-carboxylic acid consists in heating mixtures of glycocol—that is to say, amidoacetic acid—and ortho-halogen-benzoic acid—that is to say, ortho-chloro-benzoic acid or ortho-brombenzoic acid—both compounds preferably in form of their metallic salts, to temperatures of about 200° to 250° centigrade. By employing, for instance, ortho-chloro-benzoic acid the process takes place according to the following equation:

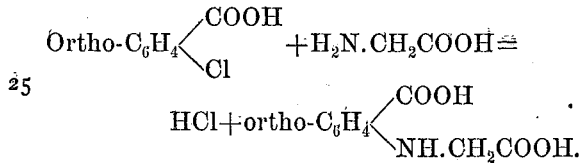

Ortho-brombenzoic acid may also be employed instead of ortho-chloro-benzoic acid.

Example: One hundred parts, by weight, of ortho-chloro-benzoic acid (or the equivalent quantity of ortho-brombenzoic acid) and forty-eight parts of glycocol in form of their alkali salts are dissolved together in water. This solution is evaporated to dryness, preferably *in vacuo*, and the mixture of the salts thus obtained is thoroughly dried at 100° to 120° centigrade. The dry mixture is then heated for some hours to about 220° centigrade. The product when cold is dissolved in water. The solution is filtered, if need be, and has added to it an excess of hydrochloric acid, whereupon the phenylglycin-ortho-carboxylic acid separates. This acid may be separated from any ortho-chlorobenzoic acid still present by treatment with chloroform. It is then purified by crystallization from water containing hydrochloric acid.

The phenylglycin-ortho-carboxylic acid thus obtained has the properties described by Mauthner and Snida, (*Wiener Monatshefte IX, 728,*) yielding when heated with caustic alkalies the known indigo reaction of Herrmann.

Having now described our invention, what we claim is—

The herein-described process for the manufacture of phenylglycin-ortho-carboxylic acid which consists in heating to a high temperature a mixture of ortho-halogen-benzoic acid and glycocol, both in form of their salts, and in isolating the phenylglycin-ortho-carboxylic acid thus formed in the manner above described.

In testimony that we claim the foregoing as our invention we have signed our names in presence of two subscribing witnesses.

BENNO HOMOLKA.
FRIEDRICH HÜBNER.

Witnesses:
HEINRICH HAHN,
ALFRED BRISBOIS.